E. C. SNEDAKER.
CHICKEN OR FOWL FEEDER.
APPLICATION FILED JULY 6, 1914.

1,181,489.

Patented May 2, 1916.
2 SHEETS—SHEET 1.

WITNESSES
E. C. Joyner.
M. F. Terry.

INVENTOR
Earl C. Snedaker
BY
F. N. Gilbert
ATTORNEY

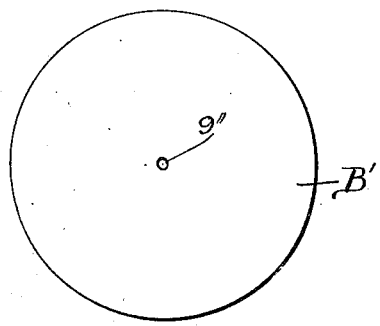
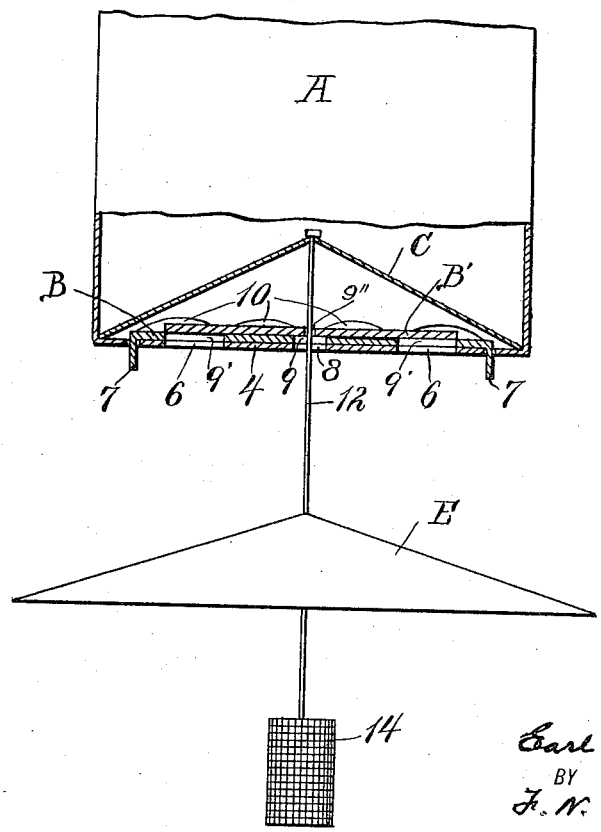

UNITED STATES PATENT OFFICE.

EARL C. SNEDAKER, OF BINGHAMTON, NEW YORK.

CHICKEN OR FOWL FEEDER.

1,181,489.   Specification of Letters Patent.   Patented May 2, 1916.

Application filed July 6, 1914. Serial No. 849,034.

*To all whom it may concern:*

Be it known that I, EARL C. SNEDAKER, a citizen of the United States, residing in Binghamton, in the county of Broome and State of New York, have invented certain new and useful Improvements in Chicken or Fowl Feeders, of which the following is a specification.

My invention relates to an improvement in chicken or fowl feeders in which the grain is caused to be automatically spread on the ground and over the ground from contact of the fowls with the device and it has for its object to provide an automatic grain feeder for fowls which supplies and scatters the grain automatically over a portion of the ground surface, its movements being developed by the action of the fowls themselves.

With this object in view my invention consists in certain novel features of construction and arrangement of parts as will be hereinafter fully described and pointed out in the claims, reference being had to the accompanying drawings in which—

Figure 1:
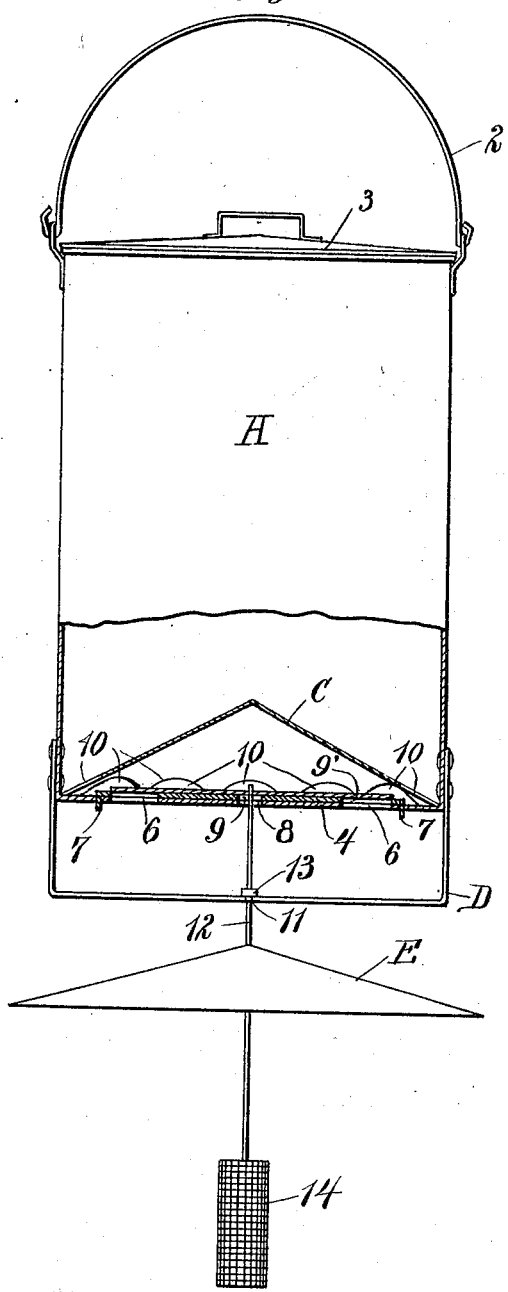
Figure 2:
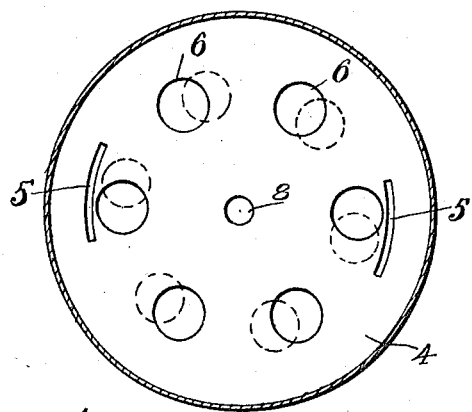
Figure 3:
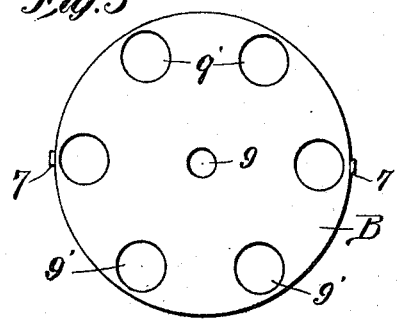
Figure 4:
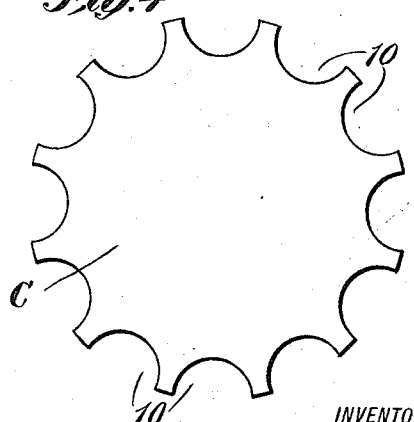

Figure 1 is a perspective view partially in cross section of my device. Fig. 2 is a plan view of a part of my device. Fig. 3 is a plan view of a part of my device. Fig. 4 is a plan view of a part of my device. Fig. 5 is a plan view of part of my device. Fig. 6 is a modified form of a part of my device.

The same reference characters denote like parts in each of the several figures of the drawing.

In carrying out my invention I provide a cylindrical body portion A having mounted thereon the usual bail 2 and lid 3 and having the bottom 4. In the bottom 4 I have two opposite curved slots 5. 5. Also in a circular a line about the bottom I have the circular openings 6. 6. 6. Loosely mounted on the bottom 4, I have the disk B having projecting from its opposite edge the lugs 7. 7 adapted to fit into and be guided by the slots 5. 5. Within the center of the bottom 4 I have the opening 8 and in the center of the disk B I have a similar circular opening 9. In a circular line around the disk B, I have the circular openings 9'. 9'., etc. Loosely mounted on the bottom or floor 4 of A (the disk B being within the pointed edge of cone C) I have the cone shaped shield C, having let into its outer edge the scallops 10. 10. 10., etc. Loosely resting on disk B, I have the agitating solid disk B'; disk B' extending just beyond the outer edges of openings 6. 6. and 9.' 9.', etc. Rigidly mounted on the sides of A, near the bottom, I have the downward projecting bail D fastened to the sides of A, in any convenient form. Through the center of D I have the opening 11 and extending through the opening 11 I have the rod 12, having mounted upon it the nut 13 and mounted on said rod 12 below the bail D I have the circular cone shaped shield E and at the base of the rod 12 I have mounted the basket 14. The rod 12 loosely suspended in the bail D extends in its upper portion up through the openings 8 in the bottom 4 and 9 in the disk B, and projects into the small opening 9'' in disk B'. Being suspended loosely in the opening 11 the rod 12 is thus capable of rocking back and forth in its suspended position and in so doing the upper end of the rod 12 contacts with the sides of the opening 9'' in the sliding disk B'.

In the operation of my device, having suspended the body A in any convenient manner in the locality for feeding, I place within A the corn or other grain material to be fed, which material thus contained in A rests upon the cone shaped disk C, the slots 10. 10 in the edge of disk C permitting small portions to filter through upon the disk B next below. I then supply the basket 14 with grain or food, to attract the attention of the fowls, of any suitable kind. The fowls to get to the grain in the basket 14 strike it with their bills causing the suspended rod 12 to swing or rock to and fro, which in turn contacting with the movable disk B' through opening 9'' causes the disk to move back and forth. Movement of the disk B' agitates the grain which falls through the openings 6 and 9' upon the shield E which causes it to be scattered in a larger surrounding area on the ground than as if dropping directly down from the suspended body A. Thus the grain is fed automatically in small degrees to the fowls below and scattered over the ground to be taken up by them, the quantity scattered and received by the fowls depending upon the activity of the fowls themselves. By means of the lugs 7. 7 guided by the slots 5. 5 I can turn disk B and thus close the openings 6. 6, etc., in floor or bottom 4 of A and thus prevent any grain passing through, or by only partially closing the opening 6. 6 I can regulate the flow of grain in any manner desired. The solid disk B' is the agitating disk having a small hole 9'' in the center thereof through which projects the rod 12. The hole 8 in floor 4 and 9 in disk B are of the same size thus leaving room for free play of the rod 12. The cone shaped disk C rests on the floor of the body A. It is not attached to its sides, neither does it rest on disk B; the agitating disk B' is much smaller than disk B and just covers the holes or openings 9' 9' 9', etc. Thus by the slightest agitation or movement of solid disk B' the holes are open and the grain will drop through the openings 6. 6 and 9'. 9'., etc., unless they are closed by the turning of the disk B by means of the lugs 7. 7. In a modified form of my device, I do away with the lower bail D entirely, as shown in Fig. 6. I have a small opening in the center of disk C or cone shaped disk C and through this I extend rod 12 and place a nut or cap on rod 12 above the cone C; thus the rod 12 is freely suspended and may vibrate back and forth and contact with the edges of the opening in sliding disk B' and thus cause it to move back and forth as in the other form of my device.

Having thus described my invention, what I claim as new and for which I desire Letters Patent is as follows:

1. In a device of the class described, a receptacle having a central perforation in its bottom surrounded by a plurality of grain feeding openings, an agitating member disposed within said receptacle and supported above said bottom for reciprocatory movement in all directions in the same horizontal plane, a rod supported from said receptacle and projecting through the central perforation in the bottom of said receptacle and loosely engaging the agitator, and a device carried by the rod adapted to be operated by the fowls for oscillating the rod for imparting movement to the agitator.

2. In a device of the class described, a receptacle having its bottom provided with feed openings, an agitating member disposed above said bottom, and supported for reciprocatory movement in all directions in the same horizontal plane, a rod depending from said receptacle and having its upper end loosely engaging the agitator for imparting movement to the latter, and means supported by said rod at its lower end to be actuated by the fowls for operating said rod and agitator.

3. In a device of the class described, a receptacle having a perforated bottom, a cone-shaped member within the receptacle provided with openings around its base, the base of said cone-shaped member resting on the bottom of the receptacle along its inner circumference, an agitating member disposed above the perforated bottom and beneath the cone-shaped member, said agitating member normally closing the perforations in the bottom, an actuating rod supported from said receptacle and engaging the agitating member to impart movement thereto, and means carried by said rod to be operated by the fowls for actuating the rod and the agitating member.

4. In a device of the class described, a receptacle having a perforated bottom, a cone-shaped member within the receptacle provided with openings around its base, the base of said cone-shaped member resting on the bottom of the receptacle along its inner circumference, an agitating member disposed above the perforated bottom and beneath the cone-shaped member, said agitating member normally closing the perforations in the bottom, an actuating rod supported from said receptacle and engaging the agitating member to impart movement thereto, a spreading device supported beneath the receptacle, and means carried by said rod to be operated by the fowls for actuating the rod and the agitating member.

5. In a device of the class described, a receptacle having a central perforation in its bottom surrounded by a plurality of feeding perforations, an agitating plate operating in the receptacle and above its bottom, an actuating rod projecting upwardly through the central perforation in the bottom of the receptacle and having engagement with the agitating plate, means for supporting said rod from said receptacle and means on the lower end of said rod to be actuated by fowls for oscillating the rod, and imparting reciprocatory movement to the agitating plate in all directions in the same horizontal plane.

6. In a device of the class described, a receptacle having a central perforation in its bottom surrounded by a plurality of grain feeding openings, an agitating element operating above said bottom, an actuating rod projecting upwardly through the central perforation in the bottom of the receptacle and loosely engaging the agitating element, means for loosely suspending said rod from the receptacle to permit said rod to oscillate in all directions, and means carried by the rod to be operated by fowls for oscillating the rod and imparting reciprocatory movement to the agitating element.

7. In a device of the class described, a receptacle provided with a plurality of grain feeding perforations in its bottom, an agitator operating within the receptacle and above the perforated bottom, a bail depending from the receptacle at the lower end thereof, a rod suspended for oscillation in all directions from said bail and projecting upwardly into engagement with the agitator, a spreader supported on the rod beneath the receptacle, and devices on the lower end of the rod to be engaged by fowls for oscillating the rod and imparting movement to the agitator.

In testimony whereof I have affixed my signature in the presence of two witnesses.

EARL C. SNEDAKER.

Witnesses:
E. A. JOYNER,
M. F. TERRY.

Copies of this patent may be obtained for five cents each, by addressing the "Commissioner of Patents, Washington, D. C."